(12) United States Patent
Juncker et al.

(10) Patent No.: US 11,328,537 B2
(45) Date of Patent: May 10, 2022

(54) METHOD OF MULTI-FINGER ENROLLMENT FOR A USER

(71) Applicant: Fingerprint Cards AB, Gothenburg (SE)

(72) Inventors: Carsten Juncker, Herlev (DK); Klaus S. Andersen, Hvidovre (DK)

(73) Assignee: FINGERPRINT CARDS ANACATUM IP AB, Gothenburg (SE)

( * ) Notice: Subject to any disclaimer, the term of this patent is extended or adjusted under 35 U.S.C. 154(b) by 0 days.

(21) Appl. No.: 17/265,889

(22) PCT Filed: Jul. 2, 2019

(86) PCT No.: PCT/SE2019/050656
§ 371 (c)(1),
(2) Date: Feb. 4, 2021

(87) PCT Pub. No.: WO2020/032851
PCT Pub. Date: Feb. 13, 2020

(65) Prior Publication Data
US 2021/0166047 A1    Jun. 3, 2021

(30) Foreign Application Priority Data
Aug. 9, 2018  (SE) .................................. 1850968-7

(51) Int. Cl.
*G06V 40/60*  (2022.01)
*G06F 3/041*  (2006.01)
(Continued)

(52) U.S. Cl.
CPC ............ *G06V 40/67* (2022.01); *G06F 3/0416* (2013.01); *G06V 10/751* (2022.01);
(Continued)

(58) Field of Classification Search
CPC ............ G06K 9/00912; G06K 9/0002; G06K 9/00067; G06K 9/00087; G06K 9/00926;
(Continued)

(56) References Cited

U.S. PATENT DOCUMENTS 6,970,582 B2   11/2005 Langley
10,102,415 B1  10/2018 Lee
(Continued)

FOREIGN PATENT DOCUMENTS

EP   3358455 A1     8/2018
WO   2017100997 A1  6/2017
WO   2019160478 A1  8/2019

OTHER PUBLICATIONS

PCT International Search Report and Written Opinion dated Sep. 5, 2019 for International Application No. PCT/SE2019/050656, 14 pages.
(Continued)

*Primary Examiner* — Abhishek Sarma
(74) *Attorney, Agent, or Firm* — RMCK Law Group, PLC

(57) ABSTRACT

The present disclosure relates to a method of authenticating a user by means of an electronic device comprising a user output interface. The present disclosure also relates to a corresponding electronic device and to a computer program product.

16 Claims, 3 Drawing Sheets

(51) Int. Cl.
*G06V 10/75* (2022.01)
*G06V 40/50* (2022.01)
*G06V 40/13* (2022.01)
*G06V 40/12* (2022.01)

(52) U.S. Cl.
CPC ...... *G06V 40/1306* (2022.01); *G06V 40/1347* (2022.01); *G06V 40/1365* (2022.01); *G06V 40/50* (2022.01)

(58) Field of Classification Search
CPC .... G06K 9/6202; G06K 9/22; G06K 9/00013; G06F 3/0416; G06F 21/32; G06V 40/67; G06V 10/751; G06V 40/1306; G06V 40/1347; G06V 40/1365; G06V 40/50; G06V 10/17; G06V 40/13
See application file for complete search history.

(56) References Cited

U.S. PATENT DOCUMENTS

| | | |
|---|---|---|
| 2008/0049987 A1 | 2/2008 | Champagne et al. |
| 2014/0079300 A1 | 3/2014 | Wolfer et al. |
| 2015/0036065 A1 | 2/2015 | Yousefpor et al. |
| 2015/0371073 A1 | 12/2015 | Cho et al. |
| 2016/0246396 A1 | 8/2016 | Dickinson et al. |
| 2017/0032166 A1 | 2/2017 | Raguin et al. |
| 2017/0220882 A1 | 8/2017 | Russo |
| 2018/0012053 A1 | 1/2018 | Larsson et al. |
| 2018/0224999 A1* | 8/2018 | Lee ................ G06K 9/00087 |

OTHER PUBLICATIONS

Extended European Search Report dated Aug. 11, 2021 for EP Application No. 19848477.6, 11 pages.

* cited by examiner

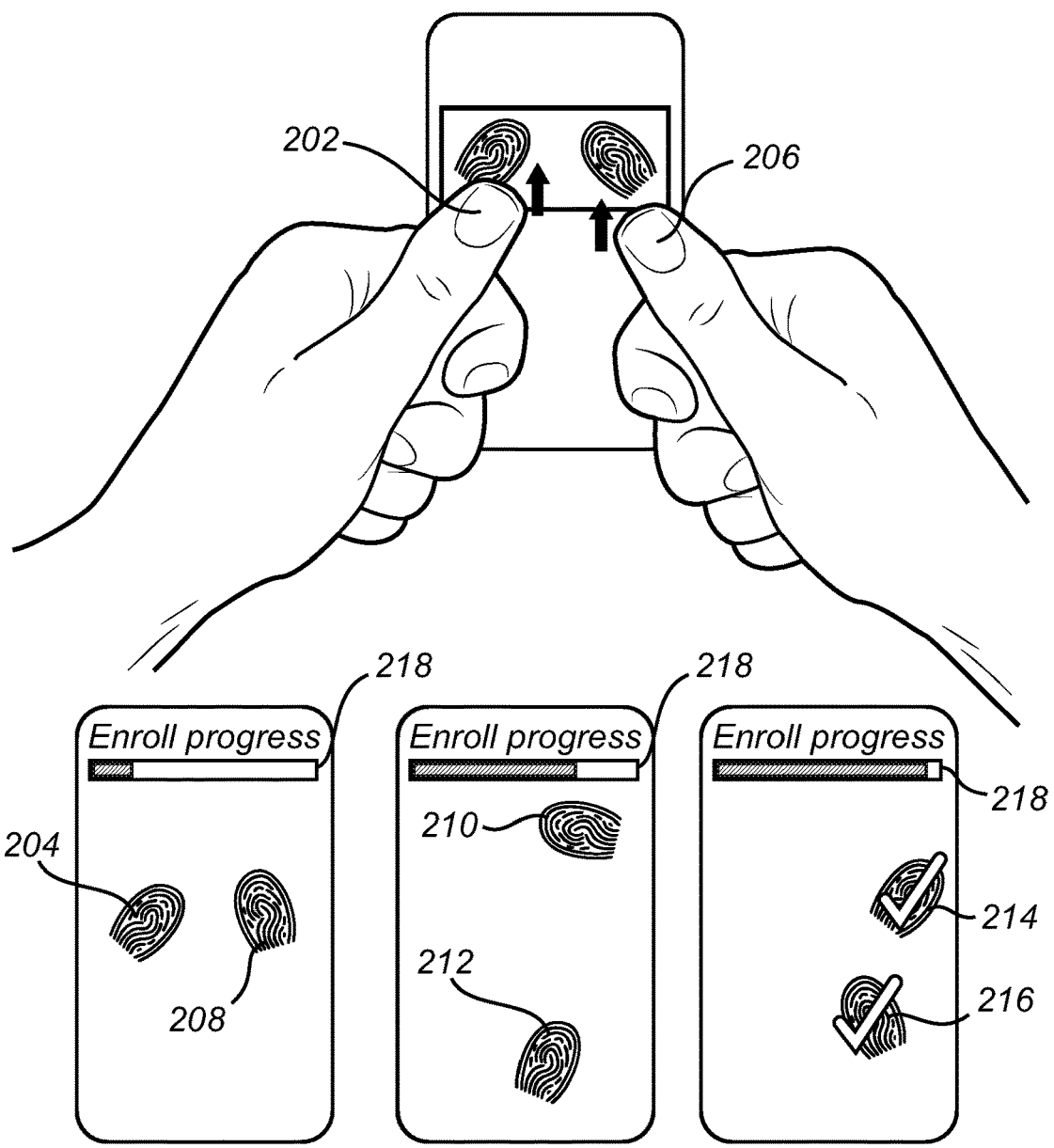
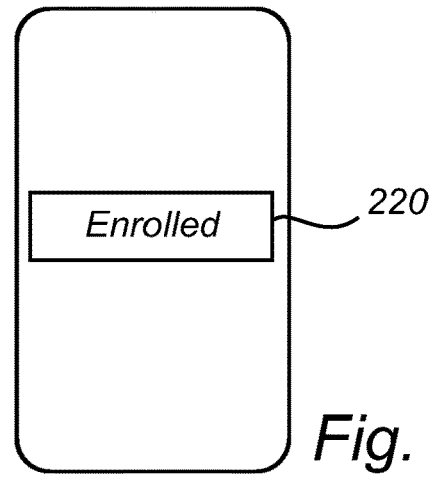
Fig. 2A  Fig. 2B  Fig. 2C
Fig. 2D

METHOD OF MULTI-FINGER ENROLLMENT FOR A USER

CROSS-REFERENCE TO RELATED APPLICATIONS

This application is a 371 U.S. National Stage of International Application No. PCT/SE2019/050656, filed Jul. 2, 2019, which claims priority to Swedish Patent Application No. 1850968-7, filed Aug. 9, 2018. The disclosures of each of the above applications are incorporated herein by reference in their entirety.

TECHNICAL FIELD

The present disclosure relates to a method of authenticating a user by means of an electronic device comprising a user output interface. The present disclosure also relates to a corresponding electronic device and to a computer program product.

BACKGROUND

Various types of biometric systems are used more and more in order to provide increased security for accessing an electronic device, thereby providing an enhanced user convenience. In particular fingerprint sensors have been successfully integrated in such devices, for example, thanks to their small form factor, high performance and user acceptance. Among the various available fingerprint sensing principles (such as capacitive, optical, thermal, ultrasonic, etc.), capacitive sensing is currently most commonly used, in particular in applications where size and power consumption are important issues. The most common fingerprint sensors currently used have a size e.g. corresponding to a fingertip (or smaller).

However, recently there has been a trend towards larger area fingerprint sensors. In relation to e.g. a mobile phone provided with a touch screen covering a majority of the front side of the mobile phone, such a large area fingerprint sensor may possibly be arranged such that it may be possible to capture a fingerprint image (of a finger of a user) essentially anywhere throughout a total surface area provided by the touch screen.

An example of such a larger area fingerprint sensor implementation is presented in US20150036065, specifically suggesting that the fingerprint sensor is incorporated in a display stack in the electronic device. Such an implementation allows for further enhancements in regards to usability for a user of the electronic device, such as for example in regards to unlocking the electronic device, signing a transaction, etc.

Even though US20150036065 present an interesting approach in regards to large area fingerprint sensors, US20150036065 is completely silent in regards to how such an implementation possibly could be exploited for also further enhancing the security for the user of the electronic device. Accordingly, there appears to room for allowing for further functionality to be implemented in regards to an electronic device comprising a large area fingerprint sensor, with specific focus on improved usability and security.

SUMMARY

According to an aspect of the present disclosure, it is therefore provided a method of fingerprint enrollment of a user by means of an electronic device comprising a display screen, a fingerprint sensing system adapted to acquire fingerprint information of the user's fingers, and a control unit, wherein an operational area of the display screen at least partly coincide with an operational area of the fingerprint sensing system, wherein the method comprises the steps of presenting a first instruction, using the display screen, to the user for enrollment positioning of a first finger at a first desired location within the operational area of the fingerprint sensing system and a second finger at a second desired location within the operational area of the fingerprint sensing system, acquiring, using the fingerprint sensing system, fingerprint information of the first and the second finger, extracting, using the control unit, fingerprint features from the acquired fingerprint information, separating, using the control unit, the extracted fingerprint features for the first and the second finger based on a correlation with the presented first and second desired locations, forming, using the control unit, a first fingerprint template for first finger based on the separated fingerprint features for the first finger, and forming, using the control unit, a second fingerprint template for second finger based on the separated fingerprint features for the second finger.

The present disclosure is generally based around the idea of adapting a so called in-display fingerprint sensing system and thereto related graphical user interface (GUI) for allowing a user to essentially simultaneously enroll more than a single finger, such as for example two or more fingers. Advantageously, by allowing for such an implementation, the time needed to be spent by a user for finger enrollment may be greatly reduced, which greatly increase the later usability of the fingerprint sensing system for further operation. In addition, by allowing more than a single finger to be enrolled (essentially simultaneously) it may be possible to increase the flexibility in future authentication of the user as well as for allowing a combination of more than a single finger to be used during authentication (e.g. two fingers must be correct for the authentication to be successful). Furthermore, the suggested implementation possibly allows for reduced computation power needed for forming the first and the second fingerprint template, since the desired locations for positioning the fingers are used in separating the extracted fingerprint features.

The fingerprint sensing system may, as indicated above, be implemented using any kind of currently or future fingerprint sensing principles, including for example capacitive, optical, thermal or ultrasonic sensing technology. Within the context of the present disclosure, the expression "fingerprint information of a finger of the user" should be interpreted broadly and to include both a regular "visual image" of a fingerprint of a finger as well as a set of measurements relating to the finger when acquired using the fingerprint sensor. A plurality of fingerprint images may be subsequently acquired and fused together, where the resulting information is used as an input for determining the sets of features.

In an alternative embodiment, the fingerprint sensing system is configured to allow the fingerprint information of the user to be acquired throughout a majority of an area covered by the display screen. Such a fingerprint sensing system may for example be implemented using ultrasonic technology, where for example a plurality of ultrasonic transducers is to be arranged in the vicinity of a circumference of the display screen.

According to the present disclosure, the control unit is preferably an ASIC, a microprocessor or any other type of computing device for controlling the operation of the fingerprint sensing system. As such, the control unit may form an integral part of the fingerprint sensing system. It may also be possible to use more than a single control unit. However, the control unit may also be a general control unit comprised with the electronic device, for example configured for controlling the overall operation of the electronic device.

The above mentioned in-display fingerprint sensing system may be adapted to acquire fingerprint information of the user's finger within an active sensing area coinciding with at least a majority of the functional area for the display screen. Such a fingerprint sensing system may for example be implemented using ultrasonic technology, where for example a plurality of ultrasonic transducers is to be arranged in the vicinity of a circumference of the display screen. In a possible embodiment of the present disclosure the plurality of ultrasonic transducers are controlled based on the first and the second desired location.

In line with the present disclosure, the first finger is thus typically selected to be different from the second finger, and the first desire location is different from the second desired location. Thus, the first and the second finger may for example be slightly separated from each other in relation to their position.

Preferably, it may also be possible to make use of how the first and the fingers are "rotated" in relation to e.g. a normalized coordinate system for the fingerprint sensing system. As such, in line with the present disclosure the first instruction may comprise an indication for a first relative rotation for the first finger and a second relative rotation for the second finger. Advantageously, the rotational information may be used both in regards to the enrollment procedure and a future authentication of the user.

Generally, the concept according to the present disclosure is increasingly advantageous when used in relation to so called large area fingerprint sensors, having an active sensing area covering a major portion of e.g. an area of the display unit (or in some cases touch screen). However, the concept according to the present disclosure may also be useful in relation to smaller fingerprint sensors, such as having a functional area only covering a minor portion of the display unit but still "large enough" for allowing for the first and the second finger to essentially simultaneously contact the fingerprint sensing system.

In accordance to the present disclosure it may be possible to adapt the method to further include presenting a second instruction, using the display screen, to the user for enrollment positioning of the first finger at a third desired location with a third relative rotation within the operational area of the fingerprint sensing system and the second finger at a fourth desired location with a fourth relative rotation within the operational area of the fingerprint sensing system, acquiring, using the fingerprint sensing system, fingerprint information of the first and the second finger, extracting, using the control unit, fingerprint features from the acquired fingerprint information, separating the extracted fingerprint features for the first and the second finger based on a correlation with the presented first and second desired locations, updating the first fingerprint template for first finger based on the separated fingerprint features for the first finger, and updating the second fingerprint template for second finger based on the separated fingerprint features for the second finger.

Accordingly, the user interface may be adapted to continuously instruct the user on how the fingers are to be positioned during enrollment, the display unit may further be used for presenting an indication of a progress of the fingerprint enrollment. Such an indication may for example comprise separate progress indications for the first and the second finger. Accordingly, the user may for example continuously be given independent information of the enrollment process for each of the finger.

According to another aspect of the present disclosure, there is provided an electronic device, comprising a display screen, a fingerprint sensing system adapted to acquire fingerprint information of a user's finger, wherein an operational area of the fingerprint sensing system at least partly coincide with an operational area of the display screen, and a control unit, wherein the control unit is adapted to present a first instruction, using the display screen, to the user for enrollment positioning of a first finger at a first desired location within the operational area of the fingerprint sensing system and a second finger at a second desired location within the operational area of the fingerprint sensing system, acquire, using the fingerprint sensing system, fingerprint information of the first and the second finger, extract fingerprint features from the acquired fingerprint information, separate the extracted fingerprint features for the first and the second finger based on a correlation with the presented first and second desired locations, form a first fingerprint template for first finger based on the separated fingerprint features for the first finger, and form a second fingerprint template for second finger based on the separated fingerprint features for the second finger. This aspect of the present disclosure provides similar advantages as discussed above in relation to the previous aspect of the present disclosure.

In an embodiment of the present disclosure, the electronic device is a mobile phone, a tablet a laptop, and/or possibly a large area interactive screen, etc. The fingerprint sensing system may for example be used by the user to unlock the electronic device, signing a transaction, etc.

According to a further aspect of the present disclosure, there is provided a computer program product comprising a non-transitory computer readable medium having stored thereon computer program means for fingerprint enrollment of a user by means of an electronic device comprising a display screen, a fingerprint sensing system adapted to acquire fingerprint information of the user's fingers, and a control unit, wherein an operational area of the display screen at least partly coincide with an operational area of the fingerprint sensing system, wherein the computer program product comprises code for presenting a first instruction, using the display screen, to the user for enrollment positioning of a first finger at a first desired location within the operational area of the fingerprint sensing system and a second finger at a second desired location within the operational area of the fingerprint sensing system, code for acquiring, using the fingerprint sensing system, fingerprint information of the first and the second finger, code for extracting, using the control unit, fingerprint features from the acquired fingerprint information, code for separating, using the control unit, the extracted fingerprint features for the first and the second finger based on a correlation with the presented first and second desired locations, code for forming, using the control unit, a first fingerprint template for first finger based on the separated fingerprint features for the first finger, and code for forming, using the control unit, a second fingerprint template for second finger based on the separated fingerprint features for the second finger. Also this aspect of the present disclosure provides similar advantages as discussed above in relation to the previous aspects of the present disclosure.

As mentioned above, the control unit is preferably an ASIC, a microprocessor or any other type of computing device. Similarly, a software executed by the control unit for operating the presently disclosed functionality may be stored on a computer readable medium, being any type of memory device, including one of a removable nonvolatile random access memory, a hard disk drive, a floppy disk, a CD-ROM, a DVD-ROM, a USB memory, an SD memory card, or a similar computer readable medium known in the art.

Further features of, and advantages with, the present disclosure will become apparent when studying the appended claims and the following description. The skilled addressee realize that different features of the present disclosure may be combined to create embodiments other than those described in the following, without departing from the scope of the present disclosure.

BRIEF DESCRIPTION OF THE DRAWINGS

The various aspects of the present disclosure, including its particular features and advantages, will be readily understood from the following detailed description and the accompanying drawings, in which:

FIGS. 2A-2D illustrates the progress of enrollment of multiple fingers in line with the present disclosure.

DETAILED DESCRIPTION

Figure 1:
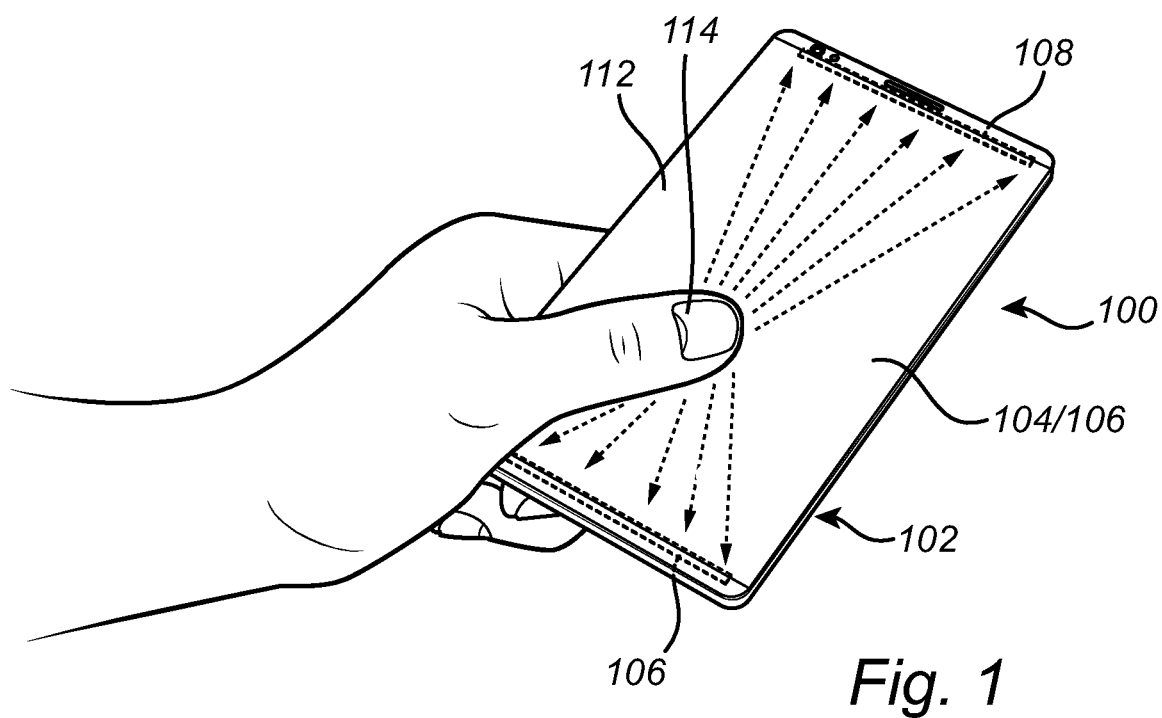
FIG. 1 is an illustration of an exemplary electronic device comprising a fingerprint sensor according to an embodiment of the present disclosure, the electronic device presented in the form of a mobile phone.

The present disclosure will now be described more fully hereinafter with reference to the accompanying drawings, in which currently preferred embodiments of the present disclosure are shown. This present disclosure may, however, be embodied in many different forms and should not be construed as limited to the embodiments set forth herein; rather, these embodiments are provided for thoroughness and completeness, and fully convey the scope of the present disclosure to the skilled user. Like reference characters refer to like elements throughout.

Embodiments described herein provide one or more fingerprint sensors that are incorporated with an electronic device. The fingerprint sensor can employ any type of sensing technology, including, but not limited to, capacitive, piezoelectric, and ultrasonic sensing technologies. In one embodiment, a single fingerprint can be captured at one time at a single pre-defined fixed location on a display. In another embodiment, a single fingerprint can be acquired at one time at any location on a display. In other embodiments, multiple touches on the display can be acquired substantially simultaneously where only one fingerprint is captured at a time or where all of the fingerprints are acquired at the same time.

Directional terminology, such as "top", "bottom", "front", "back", "leading", "trailing", etc., is used with reference to the orientation of the Fig(s) being described. Because components of embodiments described herein can be positioned in a number of different orientations, the directional terminology is used for purposes of illustration only and is in no way limiting. When used in conjunction with layers of a display or device, the directional terminology is intended to be construed broadly.

Turning now to the drawings and to FIG. 1 in particular, there is schematically illustrated an example embodiment of the electronic device according to the present disclosure, in the form of a mobile phone 100 with an integrated fingerprint sensor 102 and a display unit 104 comprising a touch screen 106. In this embodiment, the fingerprint sensor 102 and the display unit 104/touch screen 106 are together arranged at the front side of the mobile phone 100. The fingerprint sensor 102 may, for example, be used for unlocking the mobile phone 100 and/or for authorizing transactions carried out using the mobile phone, etc.

In the example presented in FIG. 1, the fingerprint sensor is implemented to apply ultrasonic technology to acquire a fingerprint image of a finger of a user. The fingerprint sensor 102 may in accordance to the present disclosure for example be implemented using an ultrasonic transducer device including e.g. a first piezoelectric element and a second piezoelectric element, each having first and second transducer electrodes that are both connectable from one side of the ultrasonic transducer device. The mobile phone 100 further comprises a control unit (not explicitly shown) adapted for processing fingerprint image data acquired using the fingerprint sensor 102.

Within the context of the present disclosure, the expression "control unit" should be understood to include any type of computing device, such as an ASIC, a micro-processor, etc. It should also be understood that the actual implementation of such a control unit may be divided between more than a single element/device/circuit, collectively still referred to as a control unit.

It should be understood that the concept as is provided in line with the present disclosure also or instead may be used in relation to fingerprint sensors employing different technologies, such as e.g. capacitive, optical, etc. as has been mentioned above. Generally, the concept according to the present disclosure is increasingly advantageous when used in relation to so called large area fingerprint sensors, having a functional (or active) area covering a major portion of e.g. an area of the touch screen 106. However, the concept according to the present disclosure may also be useful in relation to smaller fingerprint sensors, such as having a functional area only covering a minor portion of the touch screen 106.

As is schematically indicated in FIG. 1, the fingerprint sensor 102 comprises a first ultrasonic transducer array 106, a second ultrasonic transducer array 108, where the control unit is connected to the first 106 and second 108 ultrasonic transducer arrays.

The first ultrasonic transducer array 106 and the second ultrasonic transducer array 108 are both acoustically coupled to a device member, such as a glass cover 112 of the display unit 104/touch screen 106. The user touch is indicated by the thumb 114 in FIG. 1.

When the fingerprint sensor 102 is in operation, the control unit 110 controls one or several piezoelectric element(s) comprised in at least one of the first 106 and the second 108 ultrasonic transducer arrays to transmit an acoustic transmit signal. Further, the control unit controls at least one of the first 106 and the second 108 ultrasonic transducer arrays to receive acoustic interaction signals, indicated by the dashed arrows in FIG. 1. The acoustic interaction signals are indicative of interactions between the transmit signal and the interface between the cover glass 112 and the skin of the user (thumb 114). The acoustic interaction signals may then be transformed to electrical signals by the receiving piezoelectric elements in the first 106 and/or second 108 ultrasonic transducer arrays, and the electrical signals are processed by the control unit to provide a representation of the fingerprint of the user.

It should be understood that the "representation" of the fingerprint of the user may be any information extracted based on the received acoustic interaction signals, which is useful for assessing the similarity between fingerprint representations acquired at different times. For instance, the representation may comprise descriptions of fingerprint features (such as so-called minutiae) and information about the positional relationship between the fingerprint features. Alternatively, the representation may be a fingerprint image, or a compressed version of the fingerprint image. For example, the image may be binarized and/or skeletonized. Moreover, the fingerprint representation may be the above-mentioned impulse response representation.

Preferably and as is apparent for the skilled person, the mobile phone 100 shown in FIG. 1 further comprises a first antenna for WLAN/Wi-Fi communication, a second antenna for telecommunication communication, a microphone, a speaker, and a phone control unit. Further hardware elements are of course possibly comprised with the mobile phone. It should furthermore be noted that the present disclosure may be applicable in relation to any other type of electronic device, such as a laptop, a remote control, a tablet, computer, IoT/Machine type communication device, or any other type of present or future similarly configured device.

Figure 3:
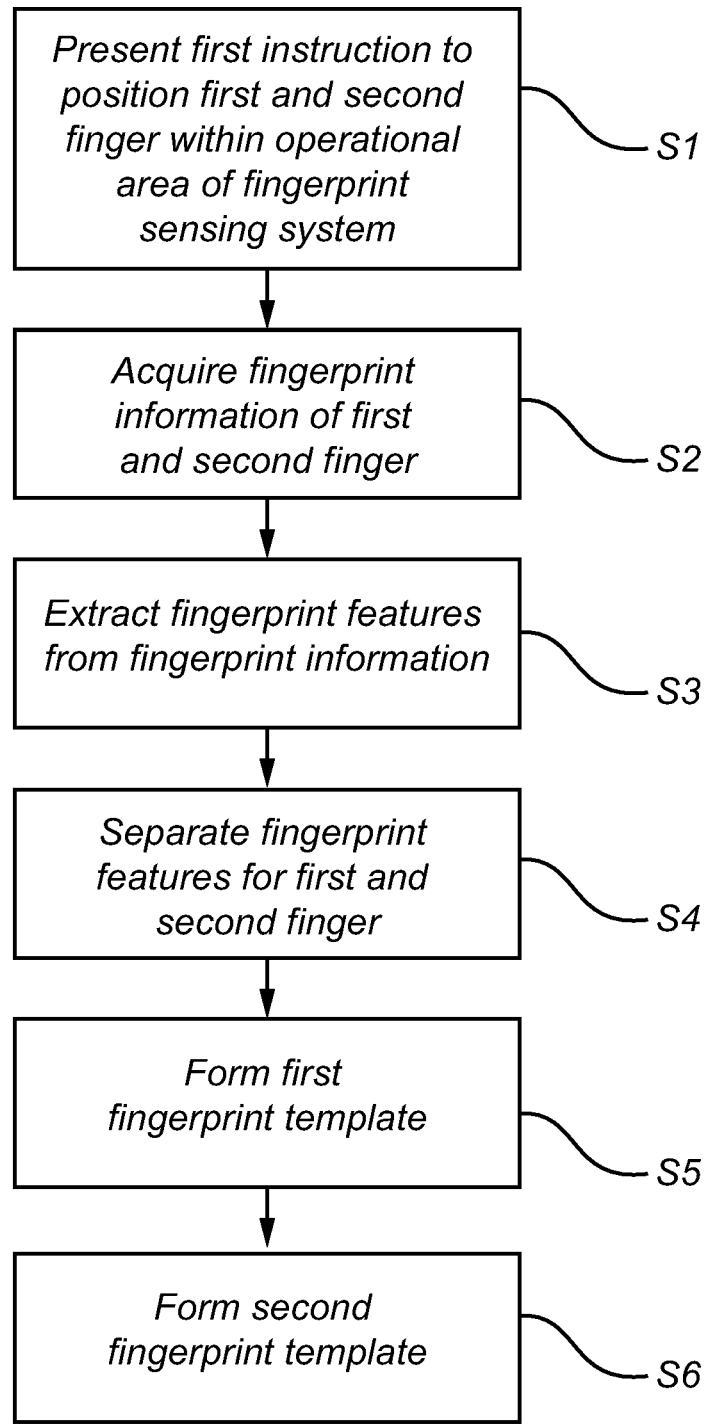
FIG. 3 is a flowchart schematically illustrating the operation as is presented in FIGS. 2A-2D.

Turning now to FIGS. 2A-2D in conjunction with FIG. 3, there is presented an exemplary progress of enrollment of multiple fingers in line with the present disclosure. Specifically, in FIG. 2A, the display unit 104/touch screen 106 presents, S1, a first instruction at a thereto provided graphical user interface (GUI). In FIG. 2A, the instruction requests the user to position one of his left fingers 202 (e.g. the first finger as defined in line with the present disclosure) at a specific first location 204. Correspondingly, the first instruction also request the user to position one of his right fingers 206 (e.g. the second finger as defined in line with the present disclosure) at specific second location 208. As is seen, the first location 204 for the left finger 202 is different from the second location 208 for the right finger 206. It should of course be understood that it may be possible to arrange the first instruction to request the user to present more than just two fingers at corresponding specific locations. Similarly, it must not be two fingers from different hands, i.e. two or more fingers from the same hand may be requested to be specifically arranged in relation to the display unit 104/touch screen 106.

Furthermore, in FIG. 2A it may be seen that the first instruction also comprises an indication to the user on how to rotate his finger in relation to the mobile phone 100 and thus in relation to the fingerprint sensor 102.

Following the presented first instruction, the user will position his fingers accordingly and the fingerprint sensor 102 will then be arranged to acquire, S2, fingerprint information of the left 202 and the right finger 206. In case of e.g. a fingerprint sensor 102 based on ultrasonic technology, it may for example be so that an overall fingerprint image corresponding to "all" of an active area of the fingerprint sensor 102 is acquired.

From this acquired fingerprint image, the control unit will then extract, S3, fingerprint features from the acquired fingerprint image. In case of an overall fingerprint image, the extraction of the fingerprint features may in this stage not necessarily be individualized for each of the two fingers simultaneously arranged at the fingerprint sensor 102 and thus comprised in the acquired fingerprint image. However, by means of the concept as defined by the present disclosure, the control unit will separate, S4, the extracted fingerprint features for the left 202 and the right 206 fingers based on a correlation with the presented first 204 and second 208 desired locations. That is, the extracted fingerprint features will be "matched" with where the first instruction requested that the fingers 202, 206 were to be positioned. This may in some embodiments greatly reduce the processing power needed for separating the fingerprint features.

Based on the separated fingerprint features for the left 202 and the right 206 finger, the control unit will subsequently form, S5, a first fingerprint template for the left finger 202 based on the separated fingerprint features for the left finger 202, and also form, S6, a second fingerprint template for right finger 206 based on the separated fingerprint features for the left finger 206.

In line with the present disclosure, and for the purpose of increasing the security of a future fingerprint authentication, it is generally desirable to allow for acquiring further fingerprint data to be included with the first and the second fingerprint templates.

Thus, as is further presented in FIGS. 2B and 2C, the user will be provided with a second (FIG. 2B) and a third (FIG. 2C) instruction using the GUI for finger positioning. It is generally desirable, as shown in FIGS. 2B and 2C to request the user to position his right 202 and left 206 fingers at different positions as compared to the original positions 204, 208 as was requested in relation to the first instruction as presented in relation to FIG. 2A.

Therefore, in FIG. 2B the user is now requested to present his right finger 202 at a third desired location 210 at the fingerprint sensor 102 and the left finger 206 at a fourth desired location 212 at the fingerprint sensor. As is further seen, the rotation for the left 202 and the right 206 finger is slightly different as compared to the requested rotation as provided in relation to the first instruction.

In a corresponding manner as discussed above, the fingerprint information of the left 202 and the right 206 fingers will be acquired; fingerprint features will be extracted and eventually separated for the left 202 and the right 206 fingers. Additionally, the separated fingerprint features will then be "appended" to the corresponding first and second fingerprint template (relating to the left 202 and the left 206 fingers, respectively). As shown in FIGS. 2A-2C, a "progress bar" 218 is presented to the user, providing an indication of a completion stage for the enrollment process.

Furthermore, as shown in FIG. 2C the user will additionally be presented with a third instruction to position his right 202 and left 206 fingers at different positions 214, 216 as compared to the positions 204, 208, 210, 212 as was requested in relation to the first instruction as presented in relation to FIGS. 2A and 2B, for the respective fingers 202, 206. Again, the rotations are slightly different.

Similarly, the fingerprint information is acquired, fingerprint features are extracted and separated, and the first and the second fingerprint template are appended accordingly. As is illustrated in FIG. 2C, the progress bar 218 now indicates that the enrollment process is completed. This may optionally, also or instead e.g. be indicated with a "check mark" possibly presented in relation to the requested positions 214, 216.

Once the enrollment process is completed, the GUI may, as shown in FIG. 2D, present such information 220 to the user. The user may then for example use the enrolled fingers for unlocking the mobile phone 100, for authenticating a transaction, etc.

In summary, the present disclosure relates to a method of fingerprint enrollment of a user by means of an electronic device comprising a display screen, a fingerprint sensing system adapted to acquire fingerprint information of the user's fingers, and a control unit, wherein an operational area of the display screen at least partly coincide with an operational area of the fingerprint sensing system, wherein the method comprises the steps of presenting a first instruction, using the display screen, to the user for enrollment positioning of a first finger at a first desired location within the operational area of the fingerprint sensing system and a second finger at a second desired location within the operational area of the fingerprint sensing system, acquiring, using the fingerprint sensing system, fingerprint information of the first and the second finger, extracting, using the control unit, fingerprint features from the acquired fingerprint information, separating, using the control unit, the extracted fingerprint features for the first and the second finger based on a correlation with the presented first and second desired locations, forming, using the control unit, a first fingerprint template for first finger based on the separated fingerprint features for the first finger, and forming, using the control unit, a second fingerprint template for second finger based on the separated fingerprint features for the second finger.

The present disclosure is generally based around the idea of adapting a so called in-display fingerprint sensing system and thereto related graphical user interface (GUI) for allowing a user to essentially simultaneously enroll more than a single finger. Advantageously, by allowing for such a solution, the time needed to be spent by a user for finger enrollment may be greatly reduced, which greatly increase the later usability of the fingerprint sensing system for further operation. In addition, by allowing more than a single finger to be enrolled (essentially simultaneously) it may be possible to increase the flexibility in future authentication of the user as well as for allowing a combination of more than a single finger to be used during authentication (e.g. two fingers must be correct for the authentication to be successful). Furthermore, the suggested implementation possibly allows for reduced computation power needed for forming the first and the second fingerprint template, since the desired locations for positioning the fingers are used in separating the extracted fingerprint features.

In a preferred embodiment of the present disclosure the fingerprint sensor 102 is configured for capturing a fingerprint representation of a fingerprint pattern of a finger of the user. In line with such an embodiment, the expressions "representation of a fingerprint pattern of a finger of the user" or "fingerprint image" should be interpreted broadly and to include both a regular "visual image" of a fingerprint of a finger as well as a set of measurements relating to the finger when acquired using a fingerprint sensor. A plurality of fingerprint representations/images may be subsequently acquired and fused together, where the resulting information is used as an input for determining the sets of features.

The mentioned fingerprint sensor may be implemented using any kind of current or future fingerprint sensing principle, including for example capacitive, optical, or thermal sensing technology, as well as a combination thereof.

The control functionality of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the present disclosure has been described with reference to specific exemplifying embodiments thereof, many different alterations, modifications and the like will become apparent for those skilled in the art.

In addition, variations to the disclosed embodiments can be understood and effected by the skilled addressee in practicing the claimed present disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method of fingerprint enrollment of a user by means of an electronic device comprising a display screen, a fingerprint sensing system adapted to acquire fingerprint information of the user's fingers, and a control unit, wherein an operational area of the display screen at least partly coincide with an operational area of the fingerprint sensing system, wherein the method comprises:

presenting a first instruction, using the display screen, to the user for enrollment positioning of a first finger at a first desired location within the operational area of the fingerprint sensing system and a second finger at a second desired location within the operational area of the fingerprint sensing system, simultaneously acquiring, using the fingerprint sensing system, fingerprint information of the first and the second finger, extracting, using the control unit, fingerprint features from the simultaneously acquired fingerprint information, the extracted fingerprint features comprising a combination of: (i) one or more fingerprint features of the first finger, and (ii) one or more fingerprint features of the second finger, separating, using the control unit, the extracted fingerprint features for the first and the second finger based on a correlation with the presented first and second desired locations, forming, using the control unit, a first fingerprint template for first finger based on the separated fingerprint features for the first finger, and forming, using the control unit, a second fingerprint template for second finger based on the separated fingerprint features for the second finger.

2. The method according to claim 1, wherein the first finger is different from the second finger and the first desired location is different from the second desired location.

3. The method according to claim 1, wherein the first instruction comprises an indication for a first relative rotation for the first finger and a second relative rotation for the second finger.

4. The method according to claim 3, further comprising the steps of:
presenting a second instruction, using the display screen, to the user for enrollment positioning of the first finger at a third desired location with a third relative rotation within the operational area of the fingerprint sensing system and the second finger at a fourth desired location with a fourth relative rotation within the operational area of the fingerprint sensing system,
acquiring, using the fingerprint sensing system, fingerprint information of the first and the second finger,
extracting, using the control unit, fingerprint features from the acquired fingerprint information,
separating the extracted fingerprint features for the first and the second finger based on a correlation with the presented first and second desired locations,
updating the first fingerprint template for first finger based on the separated fingerprint features for the first finger, and
updating the second fingerprint template for second finger based on the separated fingerprint features for the second finger.

5. The method according to claim 4, wherein at least one of:
the third desired location is different from the first desired location,
the fourth desired location is different from the first and the second desired location,
the third relative rotation is different from the first relative rotation, and
the fourth relative rotation is different from the first and the second relative rotation.

6. The method according to claim 1, wherein the operational area of the fingerprint sensing system coincides with a majority of the operational area of the display screen.

7. The method according to claim 1, wherein the fingerprint sensing system comprises a plurality of ultrasonic transducers in the vicinity of a circumference of the display screen.

8. The method according to claim 7, further comprising the step of:
controlling the plurality of ultrasonic transducers based on the first and the second desired location.

9. The method according to claim 1, further comprising the step of:
presenting, using the display screen, an indication of a progress of the fingerprint enrollment.

10. The method according to claim 9, wherein the indication of the progress of the fingerprint enrollment comprises separate progress indications for the first and the second finger.

11. An electronic device, comprising:
a display screen,
a fingerprint sensing system adapted to acquire fingerprint information of a user's finger, wherein an operational area of the fingerprint sensing system at least partly coincide with an operational area of the display screen, and
a control unit,
wherein the control unit is adapted to:
present a first instruction, using the display screen, to the user for enrollment positioning of a first finger at a first desired location within the operational area of the fingerprint sensing system and a second finger at a second desired location within the operational area of the fingerprint sensing system,
simultaneously acquire, using the fingerprint sensing system, fingerprint information of the first and the second finger,
extract fingerprint features from the simultaneously acquired fingerprint information, the extracted fingerprint features comprising a combination of: (i) one or more fingerprint features of the first finger, and (ii) one or more fingerprint features of the second finger,
separate the extracted fingerprint features for the first and the second finger based on a correlation with the presented first and second desired locations,
form a first fingerprint template for first finger based on the separated fingerprint features for the first finger, and
form a second fingerprint template for second finger based on the separated fingerprint features for the second finger.

12. The electronic device according to claim 11, wherein the fingerprint sensing system comprises a plurality of ultrasonic transducers in the vicinity of a circumference of the display screen.

13. The electronic device according to claim 11, wherein the fingerprint sensing system is employing at least one of optical, thermal and ultrasonic sensing technology.

14. The electronic device according to claim 11, wherein the fingerprint sensing system is configured to allow the fingerprint information of the user to be acquired throughout a majority of an area covered by the display screen.

15. The electronic device according to claim 11, wherein the electronic device is a mobile phone, a tablet or a laptop.

16. A computer program product comprising a non-transitory computer readable medium having stored thereon computer program means for fingerprint enrollment of a user by means of an electronic device comprising a display screen, a fingerprint sensing system adapted to acquire fingerprint information of the user's fingers, and a control unit, wherein an operational area of the display screen at least partly coincide with an operational area of the fingerprint sensing system, wherein the computer program product comprises:
code for presenting a first instruction, using the display screen, to the user for enrollment positioning of a first finger at a first desired location within the operational area of the fingerprint sensing system and a second finger at a second desired location within the operational area of the fingerprint sensing system,
code for simultaneously acquiring, using the fingerprint sensing system, fingerprint information of the first and the second finger,
code for extracting, using the control unit, fingerprint features from the simultaneously acquired fingerprint information,
code for separating, using the control unit, the extracted fingerprint features for the first and the second finger based on a correlation with the presented first and second desired locations, the extracted fingerprint features comprising a combination of: (i) one or more fingerprint features of the first finger, and (ii) one or more fingerprint features of the second finger, code for forming, using the control unit, a first fingerprint template for first finger based on the separated fingerprint features for the first finger, and code for forming, using the control unit, a second fingerprint template for second finger based on the separated fingerprint features for the second finger.

* * * * *